E. GRUENFELDT.
DEVICE FOR SUPPORTING SHAFT HANGERS.
APPLICATION FILED NOV. 15, 1907.
949,229.
Patented Feb. 15, 1910.
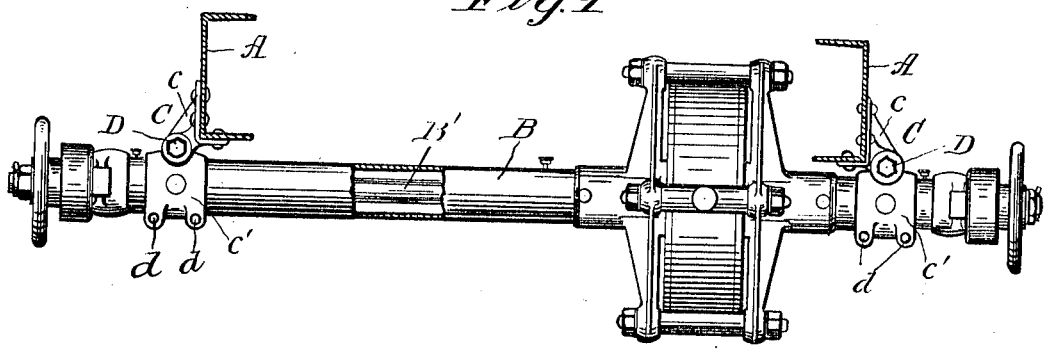
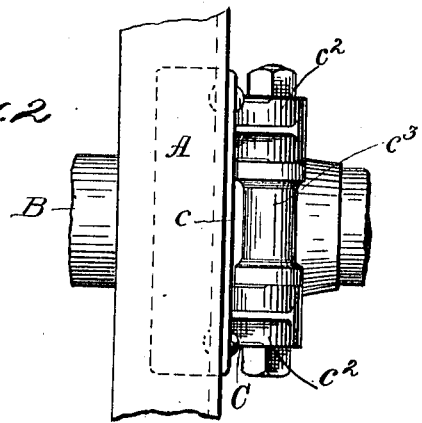
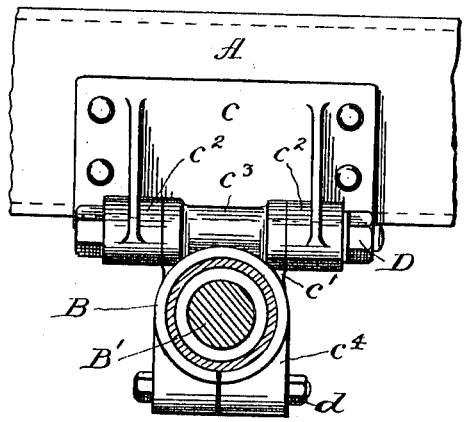
Witnesses:
Frank Krenek
J. C. Turner
Inventor:
Emil Gruenfeldt
by A. C. Merkel
Attorney.

UNITED STATES PATENT OFFICE.

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

DEVICE FOR SUPPORTING SHAFT-HANGERS.

949,229.   Specification of Letters Patent.   Patented Feb. 15, 1910.

Application filed November 15, 1907. Serial No. 402,330.

*To all whom it may concern:*

Be it known that I, EMIL GRUENFELDT, a subject of the Emperor of Germany, resident of Cleveland, county of Cuyahoga, and State of Ohio, have invented a new and useful Improvement in Devices for Supporting Shaft-Hangers, of which the following is a specification, the principle of the invention being herein explained and the best mode in which I have contemplated applying that principle, so as to distinguish it from other inventions.

My invention consists of means for supporting shafts from the frames of motor vehicles, its object being to permit of the ready disconnection of such shaft from the frame and at the same time provide for the necessary elasticity between the frame and shaft imposed by the conditions incident to the use and operation of motor vehicles.

The said invention consists of means hereinafter fully described and particularly set forth in the claims.

The annexed drawing and the following description set forth in detail, certain mechanism embodying the invention, the disclosed means constituting but one of various mechanical forms in which the principle of the invention may be applied.

In said annexed drawing: Figure 1 represents an elevation of a counter-shaft its housing and connected parts, and an automobile frame in cross-section, showing my invention as applied thereto, a portion of the shaft-housing being shown broken away in order to disclose the location of the counter-shaft therein. Fig. 2 represents, on an enlarged scale, a plan of a portion of one side of the automobile frame to which my improved shaft-support is attached, showing also a portion of the countershaft-housing. Fig. 3 represents, on a similar scale, a side elevation of such frame-portion together with my said improved shaft-support, the shaft and its housing.

Referring first to Fig. 1, A represents the automobile frame and B the housing of the counter-shaft B'. The latter is suitably journaled in bearings in this housing, as will be readily understood.

C represents my improved support or hanger and it consists of two principal parts $c$ and $c'$. The portion $c$ is formed with an angle which receives the outer side and bottom of the frame A, this part being suitably secured, in the described position, by means of rivets, as shown. Two ears $c^2$ $c^2$ are formed upon the part $c$ and are bored out in a direction parallel with the general plane of the frame to receive a bolt D. Upon that portion of the bolt between the two ears $c^2$ $c^2$ is journaled a bearing-portion $c^3$ which forms a part of the lower portion $c'$ of the hanger. This latter part is further provided with a split sleeve $c^4$ which receives the countershaft-housing B, the latter being secured fixedly therein by means of bolts $d$ $d$. The part $c$ is so formed as to permit the part $c'$ to depend below the lower surface of the frame so that the entire housing may be located below the latter.

When it is desired to remove the counter-shaft, its housing and connected parts for the purpose of disassembling the machine or repairing same, it is only necessary to remove the bolts D whereupon the entire structure may be dropped down and away from the frame. The bolts D and the portion $c^3$ of the hanger provide an oscillatory connection between the frame and the shaft whereby any displacement of the two sides of the vehicle frame relatively to each other will not materially strain the shaft-housing, as will be readily understood, the necessary elasticity between the frame and shaft or its housing being thus obtained.

Other modes of applying the principle of my invention may be employed, instead of the one explained, and change may be made as regards the mechanism herein disclosed, provided the means covered by any one of the following claims be employed.

I, therefore, particularly point out and distinctly claim as my invention:—

1. In mechanism of the class described, the combination with a motor vehicle frame; of a shaft hanger comprising a part fixedly secured to the frame, together with a second part removably suspended from said fixedly secured part, and having a horizontal axis of oscillation; said second part being further formed with a lower portion provided with a hollow sleeve split on its under side and adapted to receive and support a shaft housing whose axis is transverse with respect to the axis of oscillation; a shaft housing in said sleeve; bolts through said lower portion to fixedly secure said shaft housing within said sleeve.

2. In mechanism of the class described, the combination with a motor vehicle frame; of a shaft hanger including a part fixedly secured to the frame formed with two ears, each provided with horizontally alined openings for receiving a horizontally placed bolt; a bolt removably seated in said opening, and a second part provided with an upper portion located between said ears and formed with an opening therethrough in alinement with the openings of said ears, said bolt passing through such opening and removable therefrom; said second part further formed with a lower portion provided with a hollow sleeve split in a direction transverse to the axis of oscillation; bolts through said sleeve and transverse to said split portion, said sleeve being adapted to support and secure a member whose axis is transverse with respect to the axis of said bolt.

Signed by me, this 12th day of November, 1907.

EMIL GRUENFELDT.

Attested by—
WM. ROTHENBERG,
LENA A. DIRLAM.